H. D. CHANDLER.
EXTENSION SEAT BACK FOR AUTOMOBILES.
APPLICATION FILED JUNE 16, 1915.
1,221,969.
Patented Apr. 10, 1917.
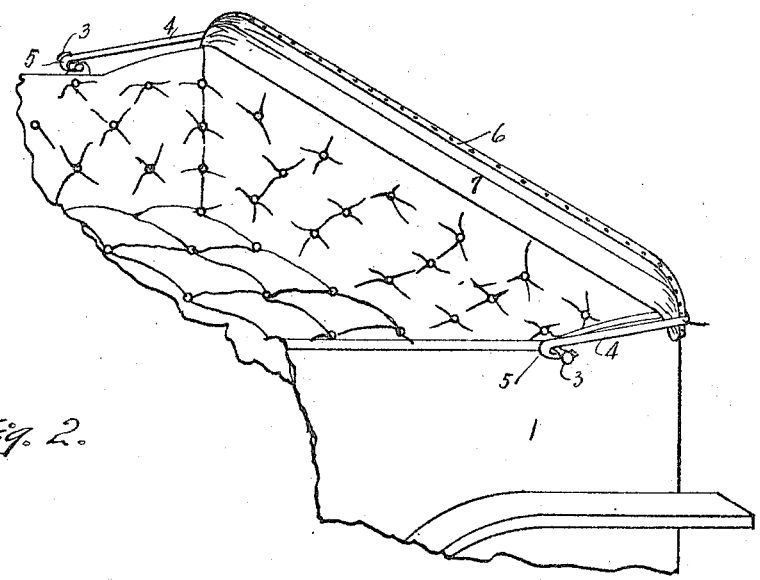
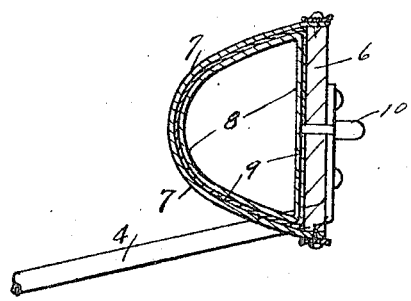
WITNESSES:
Frank T. Sarle
INVENTOR
Harry D. Chandler
BY
Fred P. Gorin
ATTORNEY

UNITED STATES PATENT OFFICE.

HARRY D. CHANDLER, OF SEATTLE, WASHINGTON.

EXTENSION SEAT-BACK FOR AUTOMOBILES.

1,221,969.     Specification of Letters Patent.     Patented Apr. 10, 1917.

Application filed June 16, 1915. Serial No. 34,326.

*To all whom it may concern:*

Be it known that I, HARRY D. CHANDLER, a citizen of the United States, and a resident of Seattle, in the county of King and State of Washington, have invented certain new and useful Improvements in Extension Seat-Backs for Automobiles, of which the following is a full, true, and exact specification.

My invention relates to extension seat backs for automobiles and has for its principal object to provide an extension back for automobile seats which is readily attachable to the body of the automobile or the seat back. A further object is to provide a pneumatic cushion surface on the extension back, the advantages of which are a light sanitary back which possesses more resiliency, and absorbs road shocks better than an upholstered or spring back. Another object is to provide a back, the resistance offered by the cushion surface of which is readily adjustable to suit the occupant of the seat. It is a well known fact that a flexible pneumatic resisting surface of this kind will adapt itself to fit the shape of one's body more readily than either springs or upholstery and that an even distribution of pressure is always maintained. A pneumatic back will dissipate the heat of the body more readily than will upholstery. In a seat back it is highly desirable that it be of proper height so that the top of the back fit against the shoulder blades, otherwise the road vibrations will quickly tire the back. The seat backs in certain makes of automobiles are very low, the top coming at about the small of the back of the occupant.

From the foregoing the advantages of my device will be apparent.

In the drawings, Figure 1 is a perspective view of my extension back shown applied to the seat of an automobile. Fig. 2 is an enlarged cross sectional view of the extension back.

Referring more particularly to the drawings, numeral 1 designates a fragment of an automobile body having a seat and back 2. The usual studs 3 for pivoting a top are also shown. My extension seat back is adapted to rest upon the top of back 2 and form an extension thereto. It may be held in place by various means, but I prefer rods 4 having hooked ends 5 which are adapted to hook over studs 3 inside of the usual top rods and without interference with said top whether in raising or lowering. The other ends of rods 4 are bent around and secured to a back frame 6, of the extension back. The ends of back 6 are curved so as to move nearly fit the seat back 2. Secured to the edges of and extending forward from back 6 in the form of a loop is a suitable outer covering 7. Within outer covering 7 is an inner pneumatic tube 8 of rubber or the like. Tube 8 is inclosed in a tension casing or bag 9 which takes the thrust of the inner tube 8, thus relieving the covering 7 from strain. The bag 9 fits snugly against the back 6 as well as the covering 7. A valve 10 is attached to tube 8 and passes through back 6 so that the said tube can be inflated, without removing from the covering, to any desired degree of hardness. The size and shape of my extension back may be altered to fit any particular car and is removably and swingably attachable.

While I have shown a particular form of embodiment of my invention, I am aware that many minor changes therein will readily suggest themselves to others skilled in the art without departing from the spirit and scope of the invention, and I therefore, desire to avoid being limited to the exact form shown and described except as pointed out in the appended claims.

Having described my invention, what I claim as new and desire to protect by Letters Patent, is—

1. In an automobile extension seat back, the combination of an extension back means, whereby the back of a seat is made higher, and means for removably and swingably attaching the said back to the body of an automobile, said back means including a cushion attached to a rest member which fits the top of the back of the seat, said attaching means including forwardly extending arms which terminate in hooks adapted to engage the top supporting bracket of the vehicle.

2. An attachment for the seat of an automobile or the like, including a cushion adapted to rest upon and be supported by the top of the seat back, arms extending downwardly and forwardly from the ends of said cushion and means for detachably securing the arms to the automobile structure, said means constituting the sole connection between the cushion and the seat.

3. The combination with a vehicle seat having an upstanding back, of a cushion removably resting upon said back, forwardly extending arms at the ends of the cushion, and means for securing said arms to the sides of the vehicle structure and constituting the sole connection between the cushion and the seat.

HARRY D. CHANDLER.

Copies of this patent may be obtained for five cents each, by addressing the "Commissioner of Patents, Washington, D. C."